United States Patent
Lawson

(12) United States Patent (10) Patent No.: US 6,710,294 B2
(45) Date of Patent: Mar. 23, 2004

(54) DEBRIS REMOVAL APPARATUS FOR USE IN LASER ABLATION

(75) Inventor: William E. Lawson, Somerset, WI (US)

(73) Assignee: Preco Laser Systems, Inc., Somerset, WI (US)

( * ) Notice: Subject to any disclaimer, the term of this patent is extended or adjusted under 35 U.S.C. 154(b) by 53 days.

(21) Appl. No.: 10/210,388

(22) Filed: Jul. 31, 2002

(65) Prior Publication Data

US 2002/0185479 A1 Dec. 12, 2002

Related U.S. Application Data

(63) Continuation of application No. 09/805,593, filed on Mar. 13, 2001, now abandoned.

(51) Int. Cl.⁷ .............................................. B23K 26/36
(52) U.S. Cl. .............................. 219/121.84; 219/121.69
(58) Field of Search .................. 219/121.6, 121.65, 219/121.66, 121.7, 121.71, 121.72, 121.84

(56) References Cited

U.S. PATENT DOCUMENTS

| | | | |
|---|---|---|---|
| 3,601,576 A | 8/1971 | Schlafli et al. | 219/121 |
| 3,824,368 A | 7/1974 | Locke | 219/121 |
| 4,315,133 A | 2/1982 | Morgan et al. | 219/121 |
| 4,689,467 A | 8/1987 | Inoue | 219/121 |
| 4,720,621 A | 1/1988 | Langen | 219/121 |
| 4,897,520 A | 1/1990 | Carter et al. | 219/121.68 |
| 5,308,951 A | 5/1994 | Mori | 219/121.84 |
| 6,204,475 B1 | 3/2001 | Nakata et al. | 219/121.84 |
| 6,588,340 B2 * | 7/2003 | Friedman | |

FOREIGN PATENT DOCUMENTS

| | | | |
|---|---|---|---|
| DE | 3405406 | * | 8/1985 |
| JP | 61-202791 | * | 9/1986 |
| JP | 11-141822 | * | 5/1999 |
| JP | 11-320171 | * | 11/1999 |

* cited by examiner

Primary Examiner—Tom Dunn
Assistant Examiner—Jonathan Johnson
(74) Attorney, Agent, or Firm—Westman, Champlin & Kelly, P.A.

(57) ABSTRACT

An apparatus which selectively directs cutting debris in selected directions while a laser beam separates a workpiece in a multi-directional relation. The apparatus comprises a positionable member rotatable about the laser beam, a nozzle attachable to the positionable member, and a programmable logic controller integrated with the positionable member to selectively position the direction of the nozzle.

11 Claims, 3 Drawing Sheets

DEBRIS REMOVAL APPARATUS FOR USE IN LASER ABLATION

This application is a continuation of Ser. No. 09/805,593 filed Mar. 13, 2001, now abandoned.

BACKGROUND OF THE INVENTION

The present invention relates to a laser cutting tool. In particular, the present invention relates to an apparatus for selectively directing cutting debris away from a preferred portion of a workpiece so that the cutting debris does not settle thereon.

Laser beams are used in numerous applications, including drilling, machining, scribing and cutting a variety of different materials. While using a laser beam in these types of applications, it is typical that cutting debris or smoke from the lasered material becomes airborne. These particles either immediately settle or suspend in the air for a period of time until they either settle upon the workpiece or elsewhere. In most circumstances, it is desirable that the particles do not settle upon the workpiece. An example of this would include the use of optically clear plastics.

When laser beams are used for cutting optically clear plastics, the laser beam typically cuts the workpiece into a preferred portion and a scrap portion. In this situation, it is important that the cutting debris be kept away from the preferred portion in order to keep the entire surface of the plastic workpiece optically clear. It is less important, if at all, as to what settles upon the scrap portion, which is either discarded or recycled for other uses.

In the event that cutting debris deposits upon the preferred portion, that portion must then be washed to remove the cutting debris, thus ensuring that the plastic is optically clear. This is burdensome and causes an additional cost to manufacturing. One way to ensure that cutting debris is not deposited upon the preferred portion of the optically clear workpiece is to place a cover sheet upon the entire workpiece. The laser beam cuts both the cover sheet and the workpiece at the same time, with the cutting debris settling upon the cover sheet. Upon completing the cutting process, the cover sheet is removed from the preferred portion of the workpiece, and then discarded. This is also burdensome and wasteful, with the cover sheet being an added expense that must be discarded after its use.

Thus, it is preferable to direct the cutting debris created by the laser beam from settling upon the preferred portion of the optically clear workpiece. There exists in the art stationary suction or blowing devices which achieve this purpose. However, these devices are somewhat limited to the application of either straight-line or purely radial cuts. These devices are not very effective when a multi-directional cut on a single workpiece is desired. As used herein, multidirectional cuts means a pattern of the preferred portion having an edge or line changing direction such as at a corner, a curve with either an increasing or decreasing radius, a curve having an inflection point, or any combination thereof. The positioning of the stationary blower and/or suction device tends to direct some or all of the cutting debris in a single direction. When a laser beam makes a multidirectional cut in relation to the workpiece, the direction that the cutting particles must be directed in order to resist deposition upon the preferred portion of the workpiece must change with the direction of the cutting path.

BRIEF SUMMARY OF THE INVENTION

The present invention is an apparatus which selectively positions a nozzle to pneumatically direct cutting debris away from a preferred portion of a workpiece wherein a laser beam separates the workpiece in a multi-directional relation. The apparatus comprises a member positionable about a laser beam cutting device, the nozzle attachable to the positionable member, and a programmable logic controller to selectively position the positionable member and nozzle.

DETAILED DESCRIPTION

Figure 1:
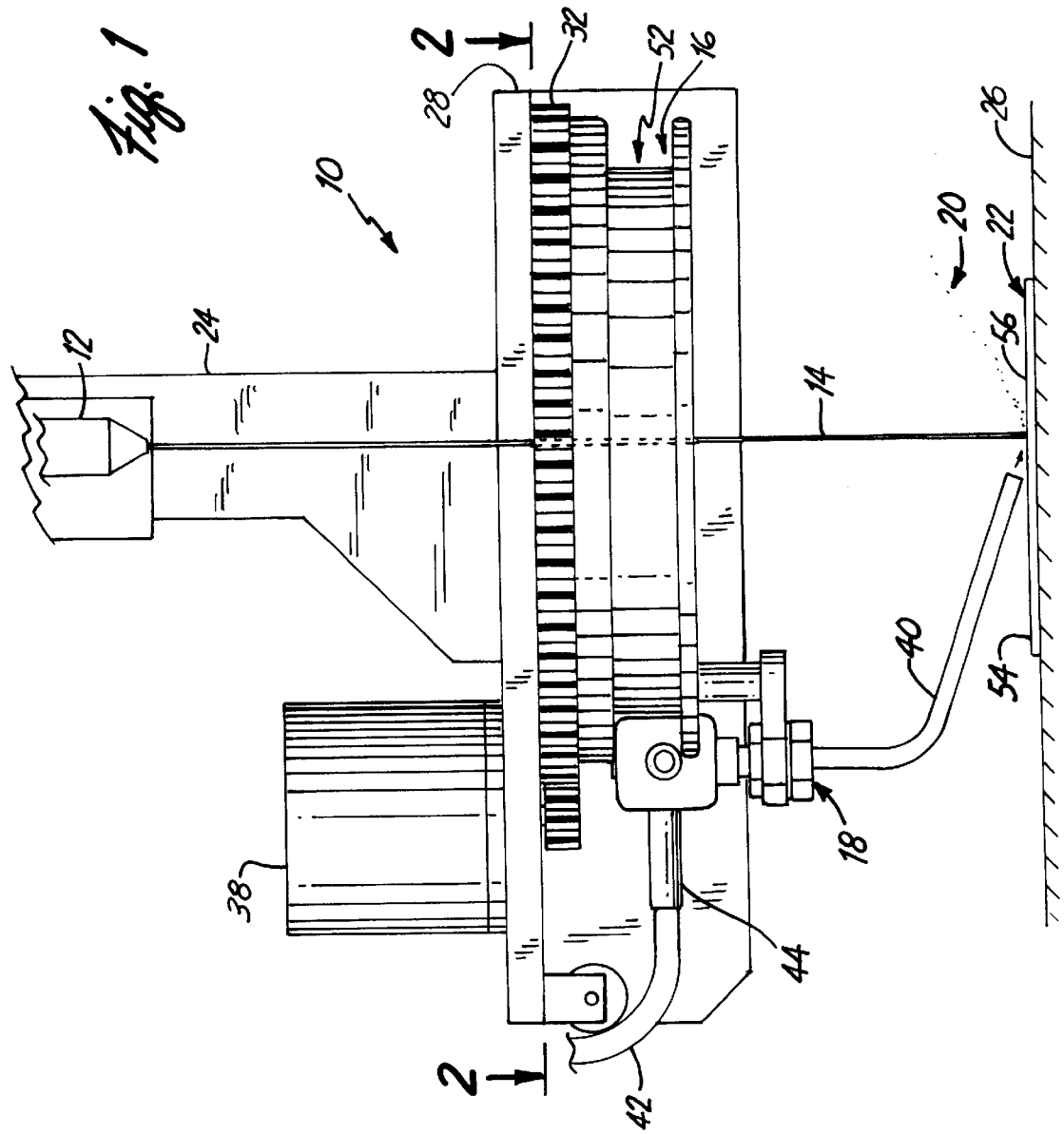
FIG. 1 is a side view of preferred embodiment of the present invention.

An apparatus to selectively direct cutting debris in various directions while a laser beam separates a workpiece, according to the preferred embodiment of the present invention, is generally indicated at 10 in FIG. 1. The apparatus 10 generally comprises a positionable laser device 12, capable of emitting a laser beam 14 for ablation purposes, a positionable member 16 maneuverable about the laser beam, and a nozzle 18 attachable to the positionable member 16, the nozzle 18 selectively positionable and capable of pneumatically directing cutting debris 20 in a selected direction. For purposes of this application, the term cutting debris includes, but is not limited to, any type of particle, smoke, plasma or other byproduct emitted from the workpiece during the ablation or cutting of the workpiece by the laser beam.

Figure 3:
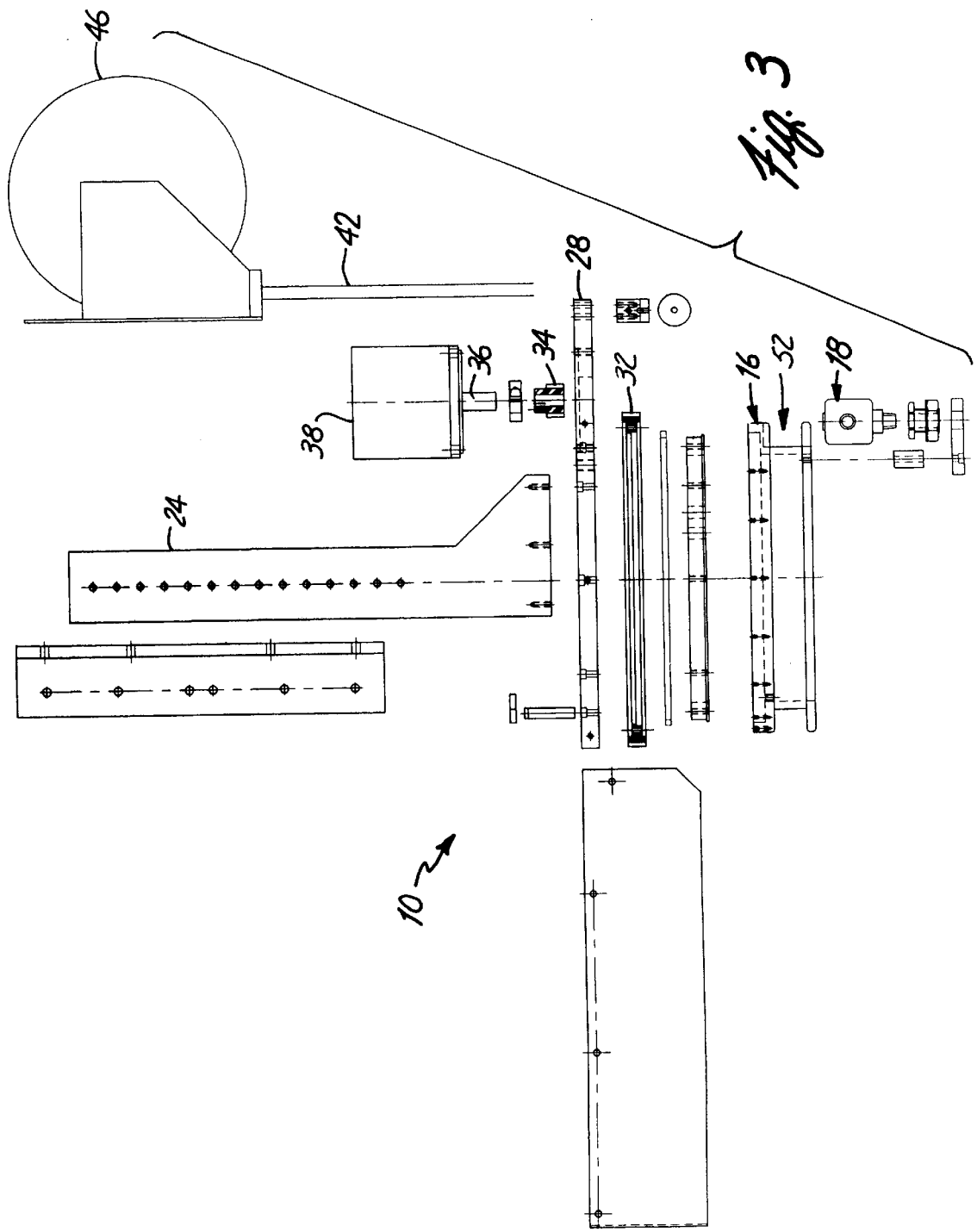
FIG. 3 is an exploded side view of the preferred embodiment of the present invention.

The laser device 12 includes any type of laser well known in the art including gas lasers, excimer lasers, or Nd:YAG lasers. The laser device 12 is positionable in relation to a workpiece 22 by being attachable to a positionable bracket 24 (as illustrated in FIG. 3), the bracket 24 being attachable to a suitable structure (not shown). Preferably the workpiece 22 rests upon a X-Y directional worktable 26, the laser device 12 positioned in a proximate fashion to the worktable 26. Thus, in the preferred embodiment of the present invention, the X-Y directional worktable 26 moves in relation to the laser device 12, the laser device 12 remaining in a stationary position with respect to the worktable 26. However, it is within the scope of the present invention to the have the worktable 26 remain stationary while the laser device 12 moves in relation to the worktable 26.

Figure 2:
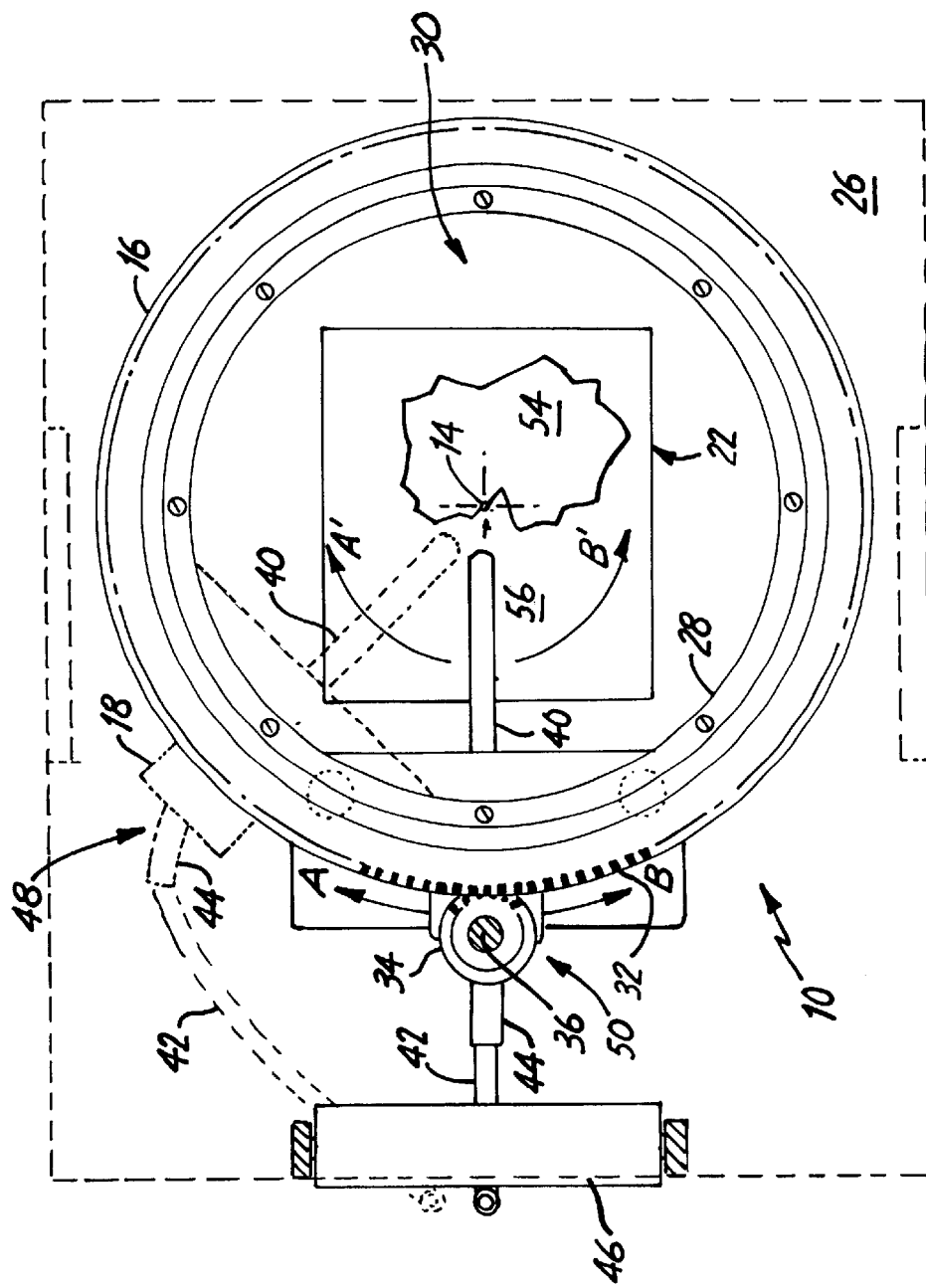
FIG. 2 is a top-plane view of the preferred embodiment of the present invention taken along line A—A of FIG. 1.

The positionable member 16 of the present invention is preferably operably attachable to a stationary support member 28. The positionable member 16 preferably is rotatable about the stationary support member 28, preferably by a ball-bearing device, or similar operably rotatable means. The stationary support member 28 is attachable to the bracket 24 proximate the laser device 12, the laser device 12 being positioned such that the emitted laser beam 14 passes through an aperture 30 contained within the stationary support member 28, as best illustrated in FIGS. 1 and 2. Preferably, the positionable member 16 includes a geared portion 32 attached thereto, the geared portion 32 providing a means to rotate the positionable member 16 by mechanically cooperating with a gear 34. The geared portion 32 mechanically cooperates with the gear 34 by being mateably engageable thereto. The gear 34 is mechanically driven by a drive 38, and preferably an electrical motor. A shaft 36 operably connects the drive 38 to the gear 34. However, alternative means to rotate the positionable member are within the scope of the present invention, including the use of a continuous V-belt in conjunction with cooperating channeled grooves connected to the positionable member and drive means.

The nozzle 18 is attached to the positionable member 16. The nozzle 18, which preferably includes a tube attachment 40, is attached to the positionable member 16 such that a direction of the tube 40, with the respect to the positionable member 16, remains constant. The length and configuration of the tube 40 is dependent upon the positioning of the positionable member 16 in relation to the workpiece 22 and worktable 26. Preferably, the tube 40 is positioned proximate an ablation point or area wherein the laser beam ablates or cuts the workpiece. The positioning of the tube 40 is such that the nozzle 18 accurately directs the cutting debris 20 in a selected direction.

Connected to the nozzle 18 is a proximate end 44 of an air hose 42. The proximate end 44 of the air hose 42 can be connected to the nozzle 18 by a variety of different means that are well known in the art. Attached to a distal end (not shown) of the air hose can either be a suction device, including a vacuum, a blower device or a compressed air source (not shown). In the embodiments including a blower device or compressed air source connected to the distal end of the air hose, the nozzle will emit a stream of gas or air, and will thus direct the cutting debris 20 in a selected direction by a blowing force. In the alternative embodiment including the suction device connected to the nozzle 18 by way of the air hose 42, the nozzle 18 will act as a vacuum and suck the cutting debris 20 into the air hose 42, the cutting debris 20 preferably being deposited in a refuse bin (not shown).

Referring to FIG. 2, the air hose 42 is disposed on a retractable coil device 46. The air hose 42 can be withdrawn from the retractable coil device 46 when the positionable member 16 and nozzle 18 rotate to a selected position 48 (shown by the dotted lines), and will be automatically recoiled back within the device 46 upon the positionable member 16 returning to an initial position 50. The retractable coil device 46 provides enough tension to keep the air hose 42 taut, ensuring that the air hose 42 will not become slack where it could be caught within a moving gear or become entangled with another device.

Additionally, it is preferable to include a channeled groove member 52 attached to the positionable member 16. The channeled groove member 52 is substantially the same size and shape of the positionable member 16. The channeled groove member 52 allows the air hose 42 to nest within its groove while the positionable member 16 rotates about the laser beam 14. It should be obvious to one skilled in the art that it is also within the scope of the present invention to include a channeled groove on the positionable member itself for which to nest the air hose 42.

In operation, the workpiece 22 to be cut or ablated is placed upon the worktable 26 in a position suitable for the laser beam 14 to appropriately ablate a desired pattern. Upon ablating the workpiece 22 and cutting the desired pattern, the laser beam 14 separates the workpiece 22 into a first preferred portion 54 and a second scrap portion 56. The preferred portion 54 of the workpiece 22 is the portion that is desired upon cutting the selected pattern. The scrap portion 56 of the workpiece 22 is the portion or portions which are not included within the selected pattern, and will in most cases either be discarded, reused in another application, or recycled.

The positionable member 16 and nozzle 18 are initially held at the initial position 50, as illustrated in FIG. 2. When the laser device 12 is activated, emitting the laser beam 14, the X-Y directional worktable 26 travels in a selected pattern, which may include the worktable 26 traveling in a multi-directional relation. When traveling in a multi-directional relation, the direction at which the workpiece travels in relation to the laser beam varies. The multi-directional relationship includes, but is not limited to, the pattern of the preferred portion having a line changing direction such as at a corner, a curve with either an increasing or decreasing radius, a curve having an inflection point, or any combination thereof. The laser beam 14 ablates the workpiece 22 as the worktable 26 travels, and thus places the workpiece 22 in the direct path of the laser beam 14, which in turn ablates the workpiece 22 with the corresponding selected pattern. This selected pattern is preferably programmed in a programmable logic controller (PLC)(not shown) which controls the movement of the X-Y directional table 26, along with activating the laser device 12.

The PLC is also programmed and integrated with the positionable member 16 to selectively position the nozzle 18 to direct the cutting debris 20 away from the preferred portion 54 of the workpiece 22. The PLC controls the drive means 38 to rotate in a specific direction. The electrical motor 38 is mechanically operable with the positionable member 16, the geared portion 32 attached to the positionable member 16 being mateably engaged to the gear 34 attached to the drive means 38. Upon activating the drive means 38, the positionable member 16 rotates in the selected direction, indicated by arrows A and B as illustrated in FIG. 2. When the positionable member 16 rotates in the direction indicated by arrow A, the tube 40 of the nozzle 18 rotates about the laser beam 14 in direction A'. When the positionable member 16 rotates in a direction indicated by arrow B, the tube 40 of the nozzle 18 rotates about the laser beam 14 in a direction indicated by B'. Referring again to FIG. 2, the dotted lines indicate a selected position 48 of the nozzle 18 and tube 40 as the positionable member 16 travels in the direction indicated by arrow B, the tube 40 of the nozzle 18 thus traveling in the direction indicated by arrow B'.

Referring to FIG. 4, a diagram is used to illustrate a hypothetical preferred portion which would require the workpiece to travel in a multi-directional relation or varying feed direction, in relation to the laser beam.

In either embodiment the present invention, the PLC is programmed to synchronize the rotation of the positionable member 16 with that of the traveling direction of the worktable 26. At all times the tube 40 of the nozzle 18 is positioned to direct the cutting debris 20 away from the preferred portion 54 of the workpiece 26.

In the embodiment of the present invention including either the blower device or compressed air source connected to the air hose 42, the PLC is programmed to position the positionable member 16 such that the tube 40 of the nozzle 18 is positioned in a substantially orthogonal relation to the immediate direction at which the worktable 26 is traveling to direct the cutting debris 20 away from the preferred portion 54 of the workpiece 26 and towards the scrap portion 56 by blowing the cutting debris 20.

In the embodiment of the present invention including the suction device connected to the air hose 42, the PLC is programmed to position the positionable member 16 such that the tube 40 of the nozzle 18 is positioned in a substantially orthogonal relation to the immediate direction at which the worktable 26 is traveling to direct the cutting debris 20 away from the preferred portion 54 of the workpiece 22 by drawing the debris 20 into the tube 40.

Although the present invention has been described with reference to preferred embodiments, workers skilled in the art will recognize that changes may be made in form and detail without departing from the spirit and scope of the invention.

What is claimed is:

1. A method of preventing ablation debris from settling upon a preferred portion of a workpiece, the method comprising the steps of:

positioning a workpiece in working relation to a laser emitting device and a nozzle; ablating the workpiece to form the preferred portion and a scrap portion, wherein a feed direction of the workpiece relative to the laser changes at least once; and positioning the nozzle to direct the debris away from the preferred portion of the workpiece relative to the changing feed direction.

2. The method of claim 1 wherein the nozzle directs the debris toward the scrap portion.

3. The method of claim 1 wherein the nozzle is positioned substantially normal to the feed direction of the workpiece in relation to the laser.

4. A method of directing ablation debris away from a preferred portion of a workpiece, the method comprising the steps of:

ablating the workpiece in a selected pattern to form the preferred portion and a scrap portion, the selected pattern having at least one change of direction; and positioning a nozzle synchronous with the selected pattern to direct the ablation debris away from the preferred portion of the workpiece.

5. The method of claim 4 wherein the nozzle is rotatably positionable about a laser beam to direct debris away from the preferred portion at an angle substantially normal to the direction of the selected pattern.

6. The method of claim 4 wherein the nozzle is rotatably positionable about a laser beam to direct debris toward the scrap portion.

7. The method of claim 6 wherein the nozzle is rotatably positionable about the laser beam to direct debris toward the scrap portion at an angle substantially normal to the direction of the selected pattern.

8. A method of directing debris away from a preferred portion of a workpiece during laser ablation, the method comprising the steps of:

positioning the workpiece in working relation to a laser emitting device and a nozzle;

activating the laser emitting device;

activating the nozzle;

positioning the workpiece in moving relation to the laser emitting device and the nozzle;

wherein a feed direction of the workpiece moving in relation to the laser emitting device changes at least once;

wherein the laser emitting device ablates the workpiece to form the preferred portion and a scrap portion; and wherein the nozzle directs debris away from the preferred portion.

9. The method of claim 8 and further comprising the steps of: positioning the nozzle about the laser emitting device to direct the debris away from the preferred portion of the workpiece.

10. The method of claim 8 wherein the nozzle directs debris toward the scrap portion of the workpiece.

11. The method of claim 8 wherein the nozzle directs debris away from the preferred portion of the workpiece by being rotatably positionable substantially normal to the feed direction.

* * * * *